W. G. HAAS.
APPARATUS FOR PNEUMATIC CONTROL.
APPLICATION FILED AUG. 24, 1916.

1,303,297.

Patented May 13, 1919.
6 SHEETS—SHEET 1.

Inventor
Walter G. Haas,
By
Attorneys

UNITED STATES PATENT OFFICE.

WALTER G. HAAS, OF DAYTON, OHIO, ASSIGNOR TO THE MIDDLETOWN MACHINE COMPANY, OF MIDDLETOWN, OHIO, A CORPORATION OF OHIO.

APPARATUS FOR PNEUMATIC CONTROL.

1,303,297.

Specification of Letters Patent.   Patented May 13, 1919.

Application filed August 24, 1916.  Serial No. 116,644.

*To all whom it may concern:*

Be it known that I, WALTER G. HAAS, a citizen of the United States, residing at Dayton, in the county of Montgomery and State of Ohio, have invented certain new and useful Improvements in Apparatus for Pneumatic Control, of which the following is a specification, reference being had therein to the accompanying drawing.

My invention relates to an apparatus for and method of pneumatic control of various mechanisms.

In the embodiment illustrated and described herein this pneumatic control is applied to a particular machine tool. I do not limit myself to such application as this control may be applied to many machines in numerous arts as for instance in brakes, hoisting machines, etc.

My object is to provide a pneumatic control which will operate a machine element, as for instance, a carriage on a lathe, in a forward or rearward direction and to simultaneously with the movement in one direction operate other mechanism as for instance locking the tool turret on the carriage as it progresses into operative position.

In particular my object is to provide an apparatus or a method of pneumatic control through a mechanism which may be controlled by a single device, by one movement of which both an inlet of air and the exhaust of air would be accomplished for operation of one portion of the mechanism and a locking or unlocking of another portion of the mechanism would be secured simultaneously.

It is my object to provide conduits which may be used for both the inlet and the exhaust of the air to operate any portion of the mechanism, the inlet and exhaust or the exhaust and inlet, taking place in succession, thereby using the same conduit for air traveling in either direction; and to provide means for maintaining the air at any desired pressure.

The invention consists essentially of: first, apparatus for controlling the pressure of the air and the quantity thereof; second, apparatus for directing the air to the machine elements to be operated through the coöperation of the third element, a motor operated by the air.

The first element is generally termed a regulator, the second a controller, and third a motor.

In its present exemplification, my invention, through the operation of a single device, accomplishes the following objects in the handling of the tool turret and carriage on a lathe:—

(1) The carriage of the lathe is advanced and retreated into any desired position.

(2) The carriage is held at any given position at the will of the operator.

(3) The tool is held in position when the carriage is advanced into operative position and the tool is released when the carriage is retreated into inoperative position.

(4) The former hand setting of the turret carrying the tool is eliminated leaving the left hand of the operator free.

(5) The former manual labor of the operator in advancing the carriage by a hand screw is eliminated.

(6) The return of the handle to a position for removal of the carriage to an inoperative position increases the supply of air rapidly as the carriage approaches its final inoperative location, so that the carriage is withdrawn with increasing rapidity; and the tool and tool chuck mounted on the carriage are also withdrawn very rapidly.

(7) The tool turret is unlocked in inoperative position so that it may be revolved to bring a new tool into position by the automatic trigger which trips the tool turret on the usual lathe.

(8) The speed of the operation of the machine and the amount of air pressure and quantity of air can be varied at the will of the operator.

(9) The pneumatic control can be readily applied to existing machine tools.

(10) Any desired pressure and quantity of air can be automatically kept constant for uniformity of speed and treatment of the work.

(11) A rapid exhaustion of air to facilitate high speed of retreat of the carriage and a relatively slow speed of advance of the carriage is accomplished.

(12) The same conduit for the introduction of air can be used for its exit.

(13) The sudden release of the tool when traveling in a forward direction is prevented, thereby guarding against injury to itself or the machine.

(14) The same air used at one time to move the machine element may be used at another time to act as a pneumatic brake or buffer to prevent injury to the mechanism and to facilitate operation.

The mechanism actuating the carriage and the mechanism operating the locking of the turret may desirably be employed together but either may be used without the other.

The use of the term "machine tool" is simply for the purposes of convenience and I do not wish to be understood as limiting myself in any particular to any one machine, as my invention is susceptible of the widest application.

In the accompanying drawings, Figs. 11 to 14 show a modified form and in these figures

Figures 1, 2:
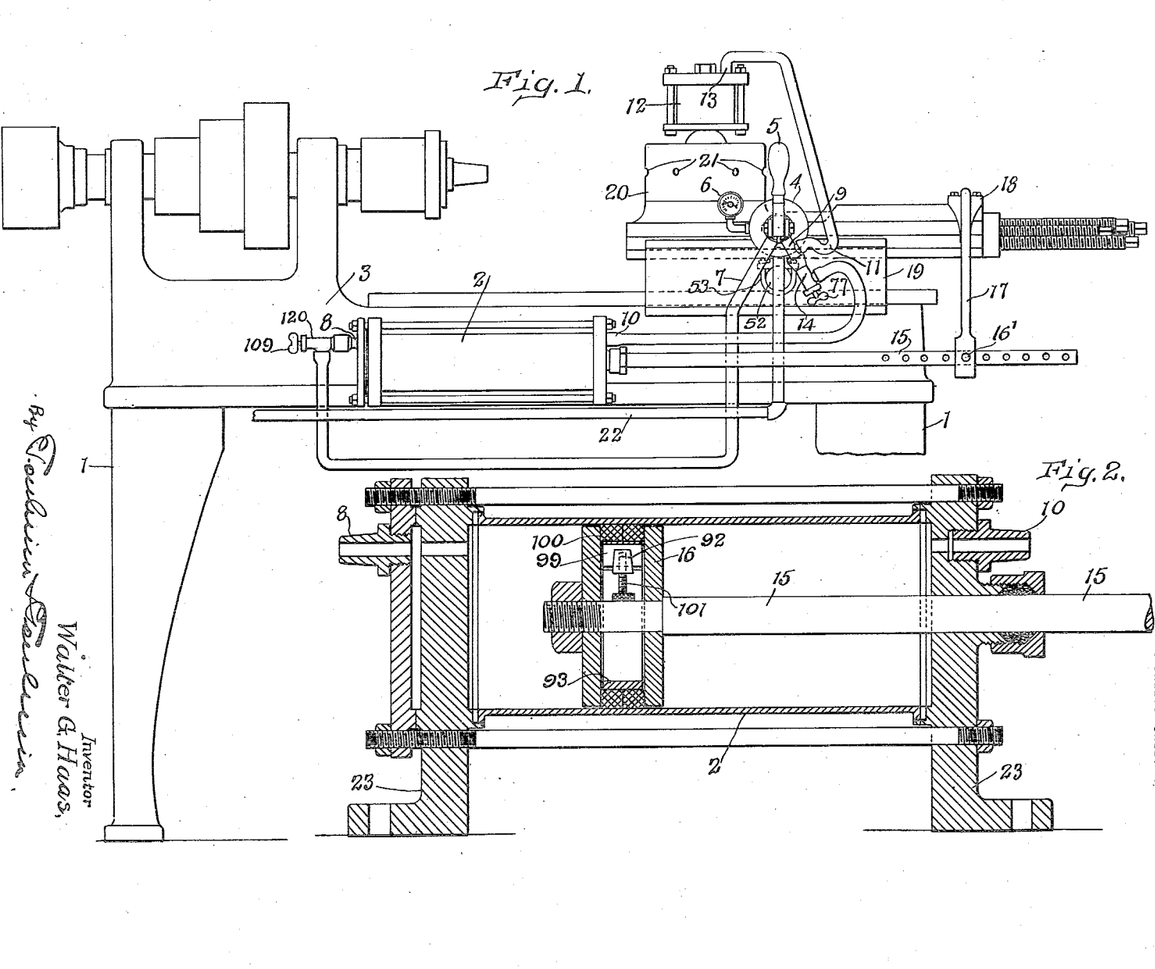
Figure 1 illustrates a side elevation of a machine tool with my invention mounted thereon.
Fig. 2 is a longitudinal vertical section of the motor.

Assembly (Fig. 1).

1 designates generally a machine tool to which my invention has been applied as illustrated in Fig. 1. 2 designates the motor attached to the lathe bed 3; 4 indicates the controller; 5 the controller handle; 6 the gage on the regulator indicating to the operator the amount of air pressure being used for each operation. 7 indicates the air conduit leading from the controller conveying air to the forward end of the cylinder 2 and entering the cylinder at 8. 9 indicates the conduit conveying air to the rear end of the cylinder 2, entering the cylinder at 10. 11 indicates the air conduit conveying air to the pneumatic lock 12 entering it at 13. 14 indicates the valve placed in the conduit or air line 9 for regulating the flow of the air in that conduit.

15 designates the piston rod connected to the piston 16 (Fig. 2) within the cylinder 2; this piston rod is connected at 16' to an arm 17 which is in turn connected at 18 to the carriage 19 upon which is mounted the tool turret 20 with its accompanying pneumatic lock 12. 21 indicates the portion of the tool turret in which the tools are inserted. 22 designates the conduit conveying the air from the source of supply to the regulator and controller.

*Fig. 2.*—In Fig. 2, 10 designates the point of communication of the conduit 9 with the rear end of the cylinder 2, 15 the piston rod and 16 the piston, while 8 designates the point of communication of the air conduit 7 with the forward end of the cylinder. 23 designates the brackets which attach the cylinder to the machine tool or lathe bed 3.

Figures 3, 4, 5:
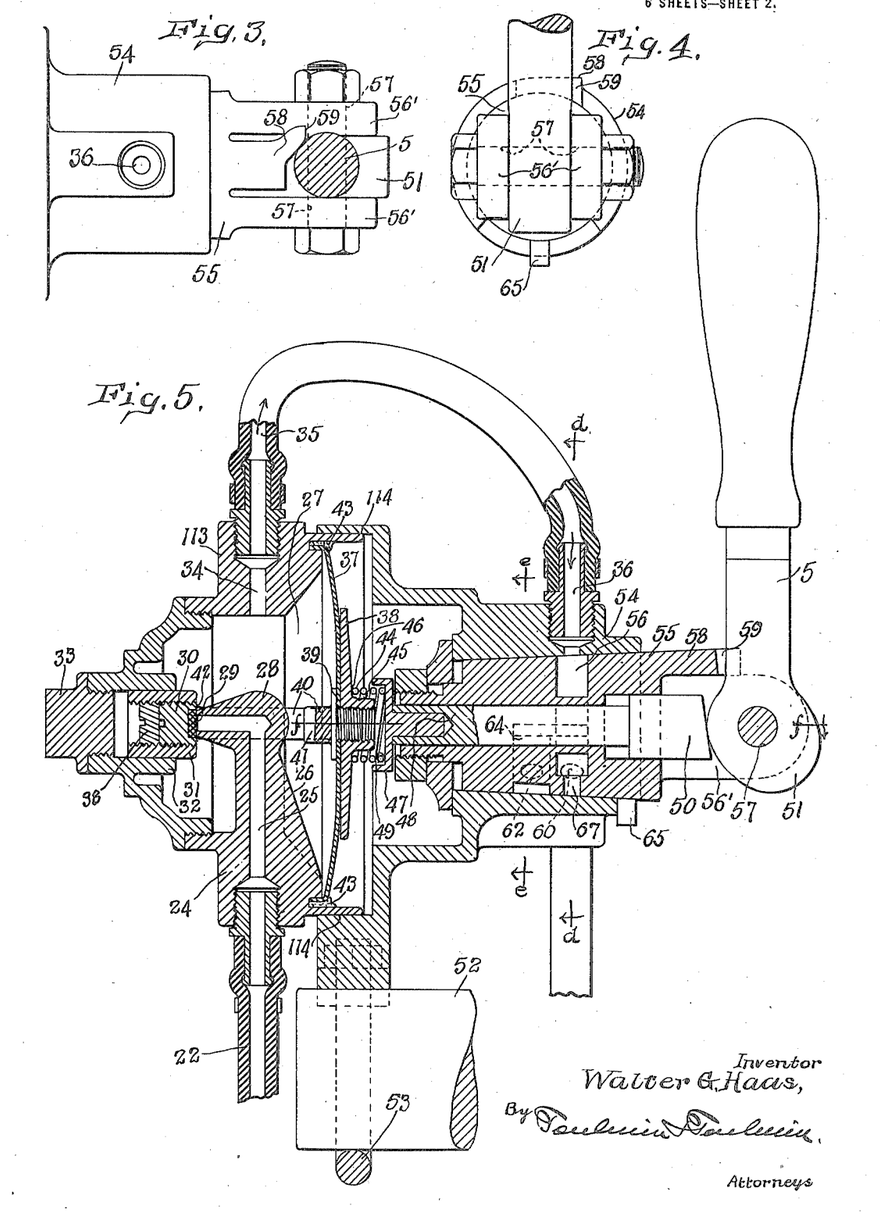
Fig. 3 is a bottom, plan view of a detail of the connection of the control handle on the controller.
Fig. 4 is an end view of the controller handle for the controller.
Fig. 5 is a vertical longitudinal section of the controller and regulator.
Figures 6, 7, 8, 9, 10:
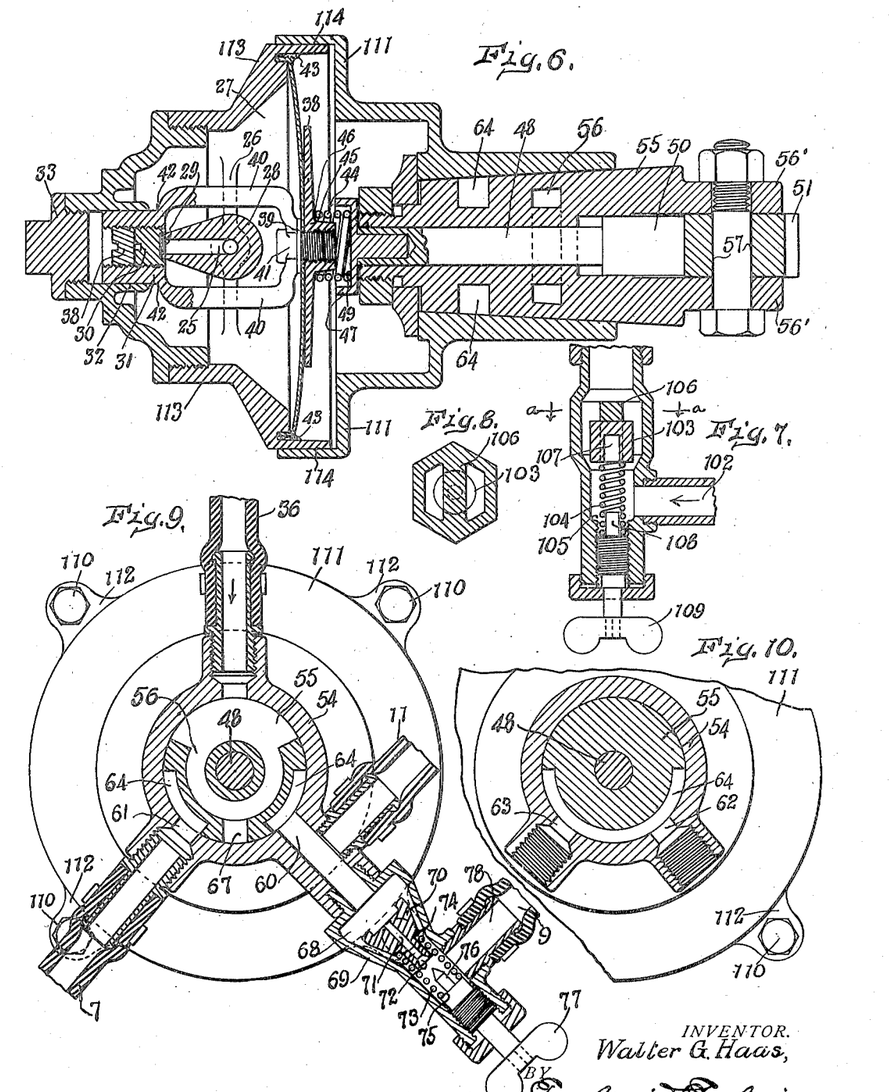
Fig. 6 is a horizontal longitudinal section of the controller and regulator.
Fig. 7 is a vertical section of the valve for checking the advance of a tool at an abnormal rate.
Fig. 8 is a horizontal section on the line $a\,a$ of Fig. 7.
Fig. 9 is a vertical transverse section on the line $d$—$d$ of Fig. 5.
Fig. 10 is a vertical transverse section on the line $e$—$e$ of Fig. 5.
Figures 11, 12, 13, 14, 21:
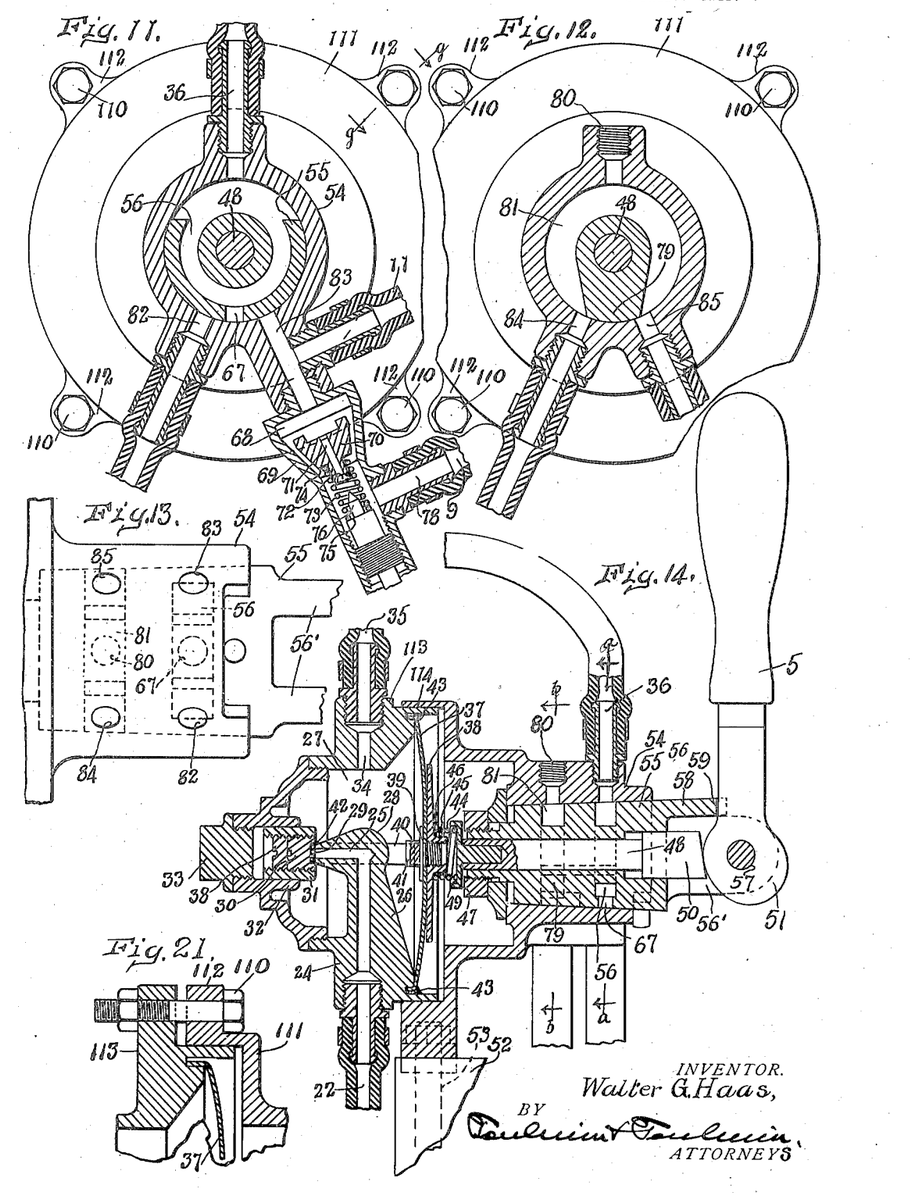
Fig. 11 is a transverse vertical section on the line $a$—$a$ of Fig. 14.
Fig. 12 is a vertical transverse section on the line $b$—$b$ of Fig. 14.
Fig. 13 is a bottom plan view illustrating the location and arrangement of ports in the controller illustrated by Fig. 14.
Fig. 14 is a vertical longitudinal section of the controller and regulator.
Fig. 21 is a detail sectional view on the line $g$—$g$ of Fig. 11 showing the means to have a certain set low pressure as a base to increase from if so desired.

Regulator (Figs. 5, 6 and 14).

In Fig. 5, 22 is the conduit from the source of supply of air which is attached to the bottom of the regulator casing 24. The air is conveyed through the inlet orifice 25. This air passage is drilled through a standard 26 projecting into the interior of the pressure chamber 27. The standard terminates in a cone shaped head 28 at right angles to its main body, and the orifice ends at the tip of the cone 28. This orifice is closed by a rubber or other resilient medium in the shape of a plug 29 carried by a plunger 30 in a shell 31. This plunger and shell travel in a guideway 32 located in one wall of the pressure chamber 27. When this plunger, shell and plug are advanced so that the rubber plug seals the orifice 25 the supply of air is cut off from the pressure chamber 27. The retreat of this plug, plunger and shell opens the orifice for the admission of air through the orifice 25 from the supply conduit 22. 33 is a screw plug in the wall of the pressure chamber 27 which may be removed for the adjustment of the plug 38, the plunger 30 and the accompanying mechanism or for the renewal of the rubber seal 29.

34 designates the exit port in the regulator. The air flows out of the port 34 in the direction of the arrow through the conduit 35 to the supply port 36 of the controller. 37 is a diaphragm secured in one wall of the pressure chamber. 38 is a reinforcing plate to which the diaphragm is secured at 39. 40 indicates a pair of fingers connected at 41 with the diaphragm and spanning the standard 26 containing the inlet port and reuniting at 42—42 (Fig. 6) by juncture with the casing 31 which carries the rubber sealing plug 29 and the screw plug 30. 43 is a sealing medium by which the diaphragm is attached to the wall of the pressure chamber. 44 is a helical spring surrounding the extension 45 of the plate 38, and normally pressing against the plate 38 at a point 46 at one end and at the other end pressing against the cup-shaped end 47 of a plunger 48 at the point 49. The plunger 48 has an enlarged beveled head 50. The surface of the beveled head 50 is in contact with the cam surface 51 carried on the end of the handle 5.

52 indicates an arm extending out from the bed of the machine tool to which the controller and regulator are attached by a strap 53.

In operation the movement of the handle 5 to the right, Figs. 5, 6 and 14, will cause the cam surface 51 to bear upon the head 50 of the plunger 48 which in turn compresses the helical spring 44, thereby exerting a pressure upon the plate 38 and the attached diaphragm 37, tending to straighten the angle of curvature of the diaphragm 37 and at the same time carry with it in a left hand direction the members 40—40, the shell 31, the plunger 30 and the rubber sealing plug 29 opening the inlet orifice 25 and allowing the air to flow into the pressure chamber 27 and thence out the outlet orifice 34. Upon the movement of the handle to the desired point a certain pressure will be exerted upon the helical spring 44 and the diaphragm 37 will be affected to the extent desired, thereby opening through its attached mechanism the orifice 25 and allowing air to enter the pressure chamber. When the quantity of air entering the chamber becomes greater than the force exerted upon the helical spring 44 which has been compressed to a desired amount through the handle 5 and the plunger 48, then the increased pressure will overcome the tension of the helical spring 44, will move the diaphragm 37 against the spring 44 and seal the orifice 25 as the sealing mechanism 29, 30 and 31, 42, 40 and 41 is attached to the diaphragm 37. As soon as the air within the pressure chamber has made its exit and reduced the pressure below the tension or pressure on the helical spring due to its setting, then the helical spring will overcome the pressure within the pressure chamber and advance to the left hand once more the diaphragm 37 opening the orifice again and allowing air to enter the second time.

This fluctuation of the diaphragm 37 continues with the alternate expansion and compression of the helical spring 44 and the alternate opening and closing of the inlet orifice or port 25, thereby maintaining a uniform pressure within the pressure chamber at any desired point which is determined by the setting of the plunger 48 and the accompanying mechanism.

Having now provided for the regulation of the pressure and quantity of the air to be delivered to the controller through the port 36, I will now proceed to describe the apparatus composing the controller and its method of operation by specific designation of the various parts composing the controller.

*Controller* (Fig. 5).

In the form of controller shown in Fig. 5 I have provided a casing 54, a supply port 36, a plug 55 in which a channel 56 has been cut to provide a passageway for the incoming air so that it will have access to the proper exit port. The plunger 48 is centrally located within the plug 55 and slides therein. The plug 55 is provided with arms 56' which embrace the lower end of the handle 5 and carry it on its bearings 57. The upper portion of the plug 55 is extended into a finger 58, the outer end of which is tapered to form a cam surface against which the handle 5 bears when it is moved to the right hand of the operator as he stands in front of the machine tool with his face to it to operate the mechanism. 59 designates this cam surface on the finger 58. 60 indicates one of the ports in the shell 54 which is utilized for both the inlet of air and the exit of air. This port is in communication with the conduit 9 which in turn leads to the rear end of the cylinder 2 and also connects with the pneumatic lock 12 of the tool turret 20.

Fig. 9 shows the location of this port 60 and also shows the location of the port 61 which communicates with the conduit 7 which in turn leads to the forward end of the cylinder 2. 61 is not shown necessarily in Fig. 5.

62 in Fig. 5 designates an exhaust port with which 60 is in communication when it is acting as inlet port.

Figure 16:
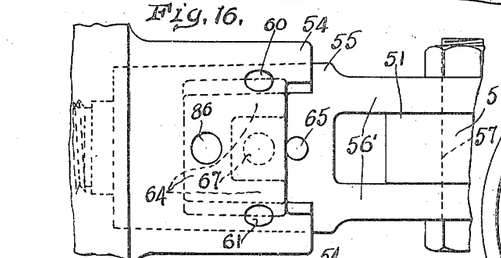
Fig. 16 is a bottom plan view of the arrangement of ports in the controller.
Figure 17:
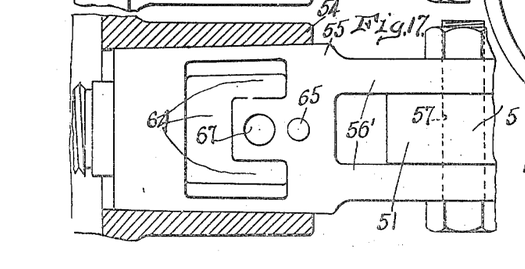
Fig. 17 is a similar view showing the location of the supply port and connecting passages in the controller.

In Fig. 10 the exhaust port 62 is shown as is also another exhaust port 63 which at another time is in communication with the port 61 when 61 is acting as an inlet port, (Fig. 8). I may use only one exhaust port and do not mean to confine myself in this particular as it is within the scope of my invention and the question of having one port for exhaust or more than one is a matter of convenience. 64 indicates the channel or passageway for the air to pass from 60 to 62 or from 61 to 63 or from 61 to 63 and 62. The method of conveying the air to these passageways will be more fully explained when the description of Figs. 13, 16 and 17 are reached. 65 (Figs. 4, 5, 14, 16, 17, 19 and 20) indicates a finger attached to the plug 55 to limit its movement from side to side, from right to left, or left to right.

In Fig. 14 a modification of Fig. 5 is shown in that the exhaust is located at the top of the casing 54 instead of at the bottom, as in Fig. 5. This point of exit is designated at 80. The exhaust may be either in the shape of a single or double port.

Referring again to Fig. 9, 36 designates the supply port, 56 the channel in the plug 55 through which the air is conveyed to either 61 or 60. The position of the plug is such in Fig. 9 that no air can be delivered in either 61 or 60. The apparatus is dead when placed at this point and the control handle will be vertical. If the handle 5 is moved to the right hand of the operator the plug 55 will be shifted so that the channel 56 and its port 67 will register with the port 61, thereby allowing the air to flow from the source of supply through the regulator into the controller, through 36, down 56, through 67 out 61 into the conduit 7 and thence to the front of the cylinder which will force back the piston 16, move the piston rod 15 and thereby retreat the carriage 19.

If the handle 5 is moved to the left hand then the plug 55 will be revolved in the opposite direction until the port 67 coincides with the port 60 and the air is permitted to flow through the conduits 11 and 9 through a pneumatic lock of the tool turret and the rear end of the cylinder, respectively. The carriage will then move forward and the tool turret will be locked and its tool mounted in it at 21 will also be locked in position to operate upon the work in hand carried by the head stock of a lathe.

When air flows out through 60, through the conduit 9 it passes into the valve casing or conduit 68 which is tapered at 69 to form a seat for the valve piston 70 which is also of tapered or conical form of the same angle of taper as the seat 69. Through the center of this valve piston 70 is a passageway 71. The piston 70 has an extended throat 72 surrounding which is a helical spring 73 which abuts against a shoulder 74 on the valve piston 70 at one end and at the other end of the spring abuts against a seat 75 located in the plunger. A needle 76 is adapted to engage the orifice of the passage 71 in order to provide both a guide for the valve piston and a seal for the orifice. When the valve piston is seated the butterfly handle 77 is used to adjust the various parts of the valve connected therewith or which come in contact with the needle and the shoulder surrounding the needle. 78 indicates the port to which the conduit 9 is attached.

In Fig. 10, 54 is the shell, 55 is the plug, 48 is the plunger shaft journaled therein, 64 is the channel or passage way for communication with an inlet port and connecting the inlet port to an exhaust port like 62 or 63.

In Fig. 11 a similar construction to Fig. 5 is shown save that ports 82 and 83 are both exit ports.

In Fig. 12, ports 84 and 85 are both inlet ports, one of which is sealed by the moving finger 79 of the plug 55 so that the air would pass out of either 84 or 85 whichever one happened to be opened and thence through the channel 81 out through the port 80 to the atmosphere. This modified form is shown in Fig. 14. The distinction between the construction shown in Figs. 5, 6, 9 and 10 and the construction shown in Figs. 11, 12 and 14 is that in the first mentioned construction an inlet port was also an outlet or exit port, while in the second construction separate conduits were used for inlet and separate conduits for exit. Fig. 13 shows the location of ports and channels in the modified form.

Figure 15:
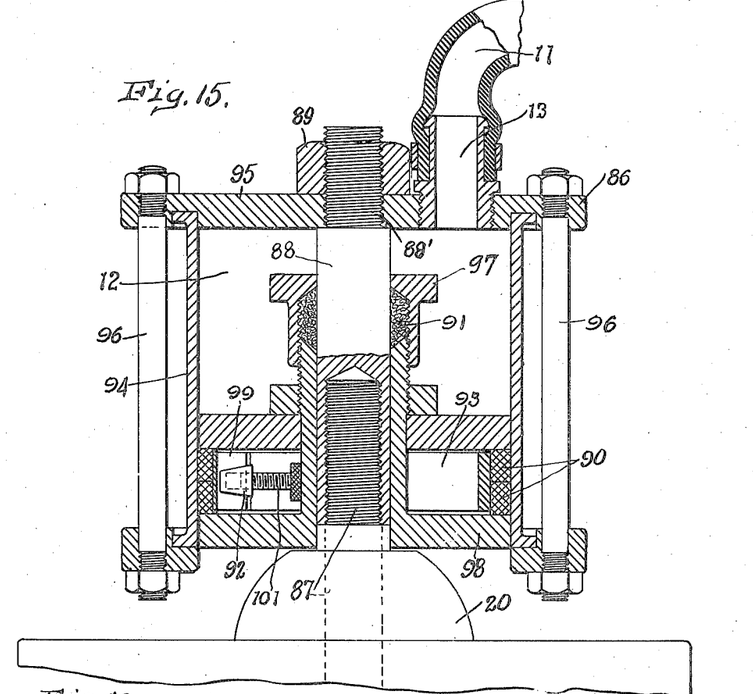
Fig. 15 is a vertical section of the pneumatic lock on the tool turret.

*Tool turret lock* (Fig. 15).

13 indicates the point of attachment of the air conduit to the cylinder 86 of the pneumatic lock 12. 98 is the piston traveling in the cylinder 86 up and down the spindle 87 and its attached parts 88 and 89 consisting of an added length of spindle screwed onto the first-mentioned spindle 87, the second mentioned spindle being 88. The cylinder 86 rests upon a shoulder 88' on the extended spindle 88 and is locked thereto by the nut 89. 90 designates the packing rings on the piston. 91 designates the packing around the base of the piston where it comes in contact with the spindle. 92 is a wedge-shaped head of the expander to expand the packing ring 93. The wall of the cylinder 94 has the top or head of the cylinder 95 clamped to it by the bolts 96. 97 indicates a collar which retains the packing 91.

In operation air is admitted through the conduit 11 and the port 13 into the cylinder 86 which forces the piston 98 into engagement with the turret 20 and locks the spindle 87 which is fixed to the carriage to the turret 20, thereby locking the turret and carriage together. Upon the release of the air from the cylinder the connection or lock between the piston head and the turret is free so that the turret can turn when it is automatically tripped upon the return of the carriage to its rearward position. Upon return of the carriage a new tool is brought into position.

Figure 18:
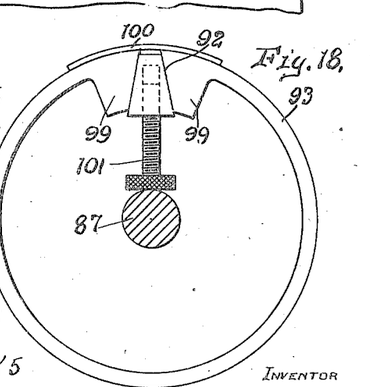
Fig. 18 is a top plan view of the packing ring.

Fig. 18 illustrates the packing ring 93, and a wedge-shaped plug 92 to expand the severed packing ring. This wedge-shaped plug 92 engages with the lugs 99—99. The shield 100 overlaps the breech in the split ring 93. The plug 92 is advanced or retreated by the screw 101.

Fig. 13 is a bottom plan view showing in dotted lines the location of the ports and passageways of the modified form, illustrated in Figs. 11, 12 and 14.

Fig. 16 is a bottom plan view showing in dotted lines the location of the ports and passageways of the preferred form shown in Figs. 5, 6, 9 and 10. A single exhaust port 86 is shown.

Fig. 17 is a bottom plan view of the controller plug 55 with the casing 54 in section. It shows the location of the orifice 67 and the passageways 64.

Fig. 7 shows the buffer valve or the valve to prevent a rapid exit of air out of the front of the cylinder 2 through the conduit 7. This valve is located in the conduit 7 at 8. When the air is flowing through the orifice 102 from the conduit 7 and thence into the cylinder 2 to push back the piston, the air flowing in the direction indicated by the arrow, the passage of the air is not disturbed by the valve in the conduit 7. When the air is passing through the valve in the other direction by reason of the fact that the air ahead of the piston is being forced out of the cylinder as the tool progresses in the work and the tool carriage advances, then the air will affect the valve slightly, but the valve piston 103 is very slightly affected because the normal pressure during the exit of the air is not great enough to compress the resilient means in the shape of a helical spring 104 which holds the valve piston 103 in normal position. When, however, the tool is driven through the work and suddenly starts forward, the air will rush out of the forward end of the cylinder and through the conduit 7. This abnormal rush of air will drive the piston 103 toward its seat 105 and compress the spring 104, thus cutting off the rapid exit of air, and the forward movement of the tool. The air in front of this piston head serves as a pneumatic buffer and prevents the tool from racing forward and striking the head stock with consequent injury to the mechanism. The fit between the piston 103 and the seat 105 is a loose, running fit, so that some air can seep past the piston and gradually escape. The bridge 106 is normally in engagement with the piston 103. The piston is a cylinder with an internal angular recess 107 cut in it which is adapted to engage with the pin 108 serving as a guide to perfectly seat the piston when the helical spring 104 is compressed. The tension of the spring can be adjusted by the set screw 109.

Referring to Fig. 8, it will be observed that the valve piston 103 is guided by the portions of the bridge 106 which extend downward on each side of the piston 103 and embrace 103 a portion of its circumference. This feature insures the perfect alinement of 103 relative to the rest of the valve and its free and rapid movement to take care of the exigencies of its work.

It has been found necessary at times to adjust the angle of curvature of the diaphragm in the regulator and thereby regulate the pressure necessary to operate the diaphragm. In order to so change the curvature of this diaphragm, nuts and bolts 110, arranged about the periphery of the casing 111, are provided which connect with lugs 112 on 111 with similar lugs on the regulator casing 113. 113 may be adjusted in relation to 111 by the loosening or tightening of these nuts and bolts 110 and the angle of curvature of the diaphragm will be accordingly determined, as will be readily observed by examining Fig. 21. The sliding fit of the two parts 113 and 111 can be observed in Figs. 5, 6 and 14 at the points 114.

Figure 19:
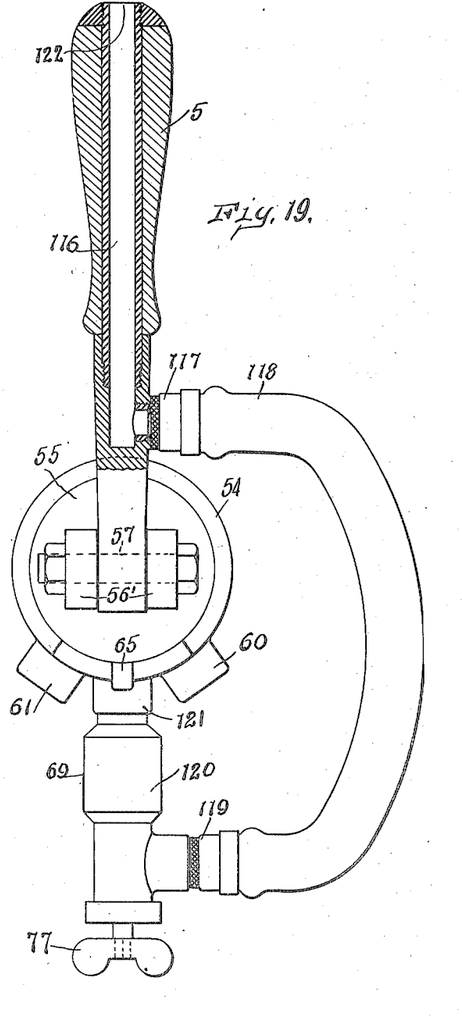
Fig. 19 is a front elevation of the controller, the handle of which is in vertical section at right angles to the line of vision of the observer.

In Fig. 19 I have illustrated a front elevation of the controller showing the special method of exhaust and its control.

5 indicates the handle which in this case has a passageway 116 extending throughout its length which is connected at 117 to a flexible conduit 118 which in turn is coupled at 119 to the pneumatic buffer or check valve illustrated in detail in Figs. 7 and 8 and designated in this figure as 120 in its entirety. 60 and 61 indicate respectively the connections with the right and left hand ends of the cylinder or motor 2.

This form of controller and exhaust may be either used with the regulator or without it. The regulator will maintain the pressure at any desired point according to the way the handle is set in an inward or outward direction. No regulator is used on some classes of work, as for instance when using a positive turret or when applied to a drill press. When the regulator is eliminated there is provided a constant pressure of a known number of pounds per square inch from a suitable source of supply.

121 indicates the port of exhaust which is a single port in this instance. In this form of my controller when the handle is either turned to the right or left and the machine is in operation the exhaust is constantly going on through 121, 120, 119, 118, 117 and out through 116. To stop the exhaust the operator puts his thumb over the orifice 122 and restricts the amount of exhaust at his pleasure, thereby holding the air which would normally pass out the exhaust behind the piston in the cylinder acting as a buffer or check on the rapidity of movement of the piston. This facilitates a very delicate control of the mechanism and its adaptation to many kinds of the finest work requiring minute adjustment, varying speeds and varying fluctuations of power. If the exhaust is completely shut off by the thumb, of course, the carriage will cease its movement altogether.

Figure 20:
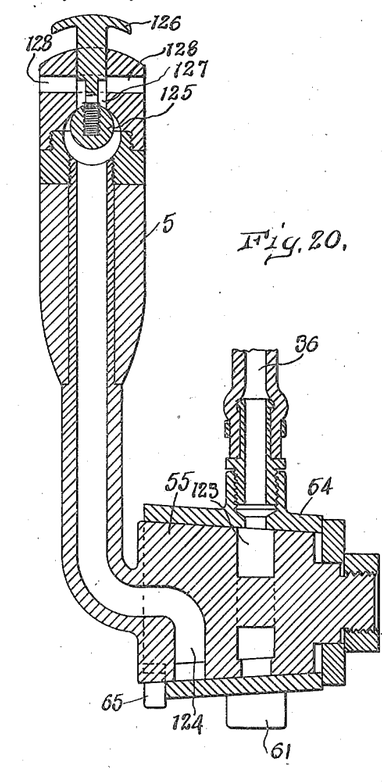
Fig. 20 is a vertical section on the longitudinal axis $f$—$f$ of the controller, in Fig. 5.

In Fig. 20 is illustrated a vertical longitudinal section of the controller without a regulator. 36 indicates the conduit from the source of supply of air, 54 the casing and 55 the valve plug. 61 indicates the exit or inlet port which communicates with the left hand end of the cylinder 2. By reason of the section the port 60 communicating with the right hand in the cylinder is not shown. The air is admitted through 36 into the passageway 123 and thence out the port 60 if desired, while at the same time the air from the forward end of the cylinder will exhaust through 61 into the passageway 124 which leads out through the handle 5 normally closed by the pressure of the exhaust by the valve 125. This valve 125 may be opened by operation of the plunger 126 which will open the orifice 127 upon the pressure of the thumb of the operator upon 126. The air will escape through the passageways 128—128 which may be of any number desired, either single, dual, triple, or quadruple, etc. In the form illustrated in Fig. 20 the exhaust is normally closed rather than normally open as in Fig. 19. In order to open the exhaust and allow the carriage to move when the handle has been moved to either right or left it will be necessary to depress the plunger 126, releasing the air from behind the piston. The same adjustment can be secured by this method as in Fig. 19. This is a very useful controller on such machines as a drill press among others where a uniform and fixed, predetermined pressure of air from the supply is suitable and a variety of pressures is not required.

*Method of operation.*

By a turn of the control handle outward toward the operator the desired pressure or amount of air for the operation of the machine tool is admitted to the pressure regulator and control valve. It can be assumed that the work is set in the lathe, that the tool is placed in the tool turret and ready for advance to operate upon the job in hand. The next step on the part of the operator is the turning of the handle to the left whereby the carriage advances and the tool turret and the tool it carries are locked in position for operation. The carriage with its accompanying tool turret and tool continues to advance until the operation on the work is completed when the operator turns the handle toward the right, whereby the carriage is withdrawn with its accompanying tool turret and tool, the tool turret is unlocked so that it may be automatically tripped as is customary on machine tools of this type and the tool turret so turned as to bring a new tool into position. The rapidity of retreat of the carriage carrying the turret will increase as the carriage progresses from the work by reason of the fact that the operating handle is given a dual movement, namely, a movement to the right and a movement outward toward the operator, the last-mentioned movement increasing the supply of air. The carriage and tool turret with its new tool is then in position to again proceed to another operation upon the job.

The relatively rapid exhaustion of the air is provided for by suitable mechanism so that the air may escape very rapidly in order to return the carriage with corresponding speed, yet it is also provided that the passage of air in the opposite direction shall be relatively slow in order that when the carriage progresses it may do so slowly and steadily in order to adapt the movement of the carriage to the work that the tool may have to do on the job in hand.

It is a further part of my mechanism and part of my process to so regulate the exit of air from the forward part of the actuating cylinder at the time the tool completes its work upon the job that the air cannot flow out quite freely from the forward end of the cylinder allowing the tool to race forward and jam the end of the tool against the opposite chuck of the work spindle. To the contrary, I have provided means of allowing the air to move out of the cylinder without interruption; but, upon a sudden release of the tool when the air is moving out of the cylinder the unusual rush of the air due to the release of the tool will close valve 69—70 partially and prevent a sudden rush of air out of the cylinder and a sudden movement of the tool. The tool will move forward slowly and easily after having completed its work without any liability of injury to itself or any other part of the mechanism by reason of this restricted release of the air when the amount of the air seeking exit is abnormal.

After the mechanism is in operation, a certain quantity of air will be stored in the pressure regulator chamber and outlet pipe line to the valve. This amount of air is under pressure of the diaphragm and helical spring pressing against the diaphragm; if allowed to escape through the valve it will operate slowly the carriage in either direction without pulling the handle toward the operator to let in air from the source of supply.

If it is desired to regulate the angle of curvature or the degree of compression of the diaphragm, thereby controlling the latitude of its movement and the readiness with which it can be affected by the air, adjusting means are provided in the form of several set screws which enable the operator to adjust the diaphragm to his exact requirements.

In case I do not employ the regulator of the air supply, but simply use the valve for directing the air as in Figs. 19 and 20, then the moving outward or inward of the lever may be eliminated. The speed of the carriage can be adjusted by the amount of air permitted to exhaust through the handle as the air behind the piston will act as a brake or buffer. If the regulator is used with the apparatus shown in Fig. 19, then the outward and inward movement is retained as described above and the feature of the pneumatic brake or buffer is employed in addition.

My method of operating the machine tool permits the operator one free hand at all times, undivided attention to the job, and a minimum of manual labor with resultant high increase in production.

Having thus fully described my invention, what I claim as new and desire to secure by Letters Patent, is:—

1. In a pneumatic control mechanism, the combination, of a controller, a motor operable by compressed air, a machine element operatively connected with said motor, and means for locking another machine element in connection with the first machine element when the first machine element and the second machine element move together in one direction, and for unlocking two machine elements when they move in another direction.

2. In a pneumatic control mechanism, the combination of a regulator, a controller, a motor operable by compressed air, a machine element operatively connected with said motor, and means for locking another machine element in connection with the first machine element when the first machine element and the second machine element move together in one direction, and for unlocking the two machine elements when they move in another direction.

3. In a pneumatic control mechanism, the combination with valve devices to control the inlet and exhaustion of compressed air, a motor operable by compressed air so controlled, and a machine element operatively connected with said motor and means for locking another machine element in connection with the first mentioned machine element when the first machine element and the second machine element move together in one direction, and for unlocking the two machine elements from one another when they move in another direction.

4. In a pneumatic control mechanism, the combination, with a regulator, valve devices to control the inlet and exhaustion of compressed air, a motor operable by compressed air so controlled, and a machine element operatively connected with said motor and means for locking another machine element in connection with the first mentioned machine element when the first machine element and the second machine element move together in one direction, and for unlocking the two machine elements from one another when they move in another direction.

5. In a pneumatic control mechanism, a conduit, a valve therein, whereby in one direction the air may be permitted to pass through the conduit freely and in another direction it may be permitted to pass through the conduit slowly.

6. In a valve, a valve casing, an inlet port, an outlet port, a valve piston, a valve seat, a resilient means for maintaining said valve piston and said valve seat out of engagement with each other for the rapid passage of air through said valve in one direction, means through said valve piston for the slow passage of air through said valve when said piston and valve seat are in engagement and said resilient means is compressed when the air passes through said valve in the other direction.

7. In a pneumatic control mechanism, a valve, a supply port, an exit port, an inlet port and an exhaust port, such inlet port and exhaust port being communicable, and means for converting the exit port into an inlet port in connection with the exhaust port, and for converting the inlet port into an exit port, a valve in said first mentioned inlet port, whereby when said port is acting as an inlet, the air flows freely, and when it is acting as an exit port the air flows slowly.

8. In a pneumatic control mechanism, a valve, a pressure regulator, a supply port, an exit port, an inlet port and an exhaust port, such inlet and exhaust ports being communicable, and means for converting the exit port into an inlet port in connection with the exhaust port, and for converting the inlet port into an exit port, and means for increasing the pressure as conversion of said respective ports takes place.

9. In a pneumatic control mechanism, the combination with a controller comprising valve devices to control the inlet and exhaust of compressed air, a motor operable by compressed air so controlled, a machine element operatively connected to said motor, and means for preventing abnormal speed of said machine element in one direction.

10. In a pneumatic control mechanism, the combination with a controller comprising valve devices to control the inlet and exhaust of compressed air, a motor operable by compressed air so controlled, a machine element operatively connected to said motor and means for the relatively slow progression of the machine element in one direction and its rapid retreat in another direction.

11. In a packing device, a split packing ring, the walls of said point of severance being inclined toward each other and approach each other more closely on the outer periphery of said packing ring, a wedge shaped plug inserted in said wedge shaped aperture and partially embracing a portion of said packing ring on each side of said aperture, a lug on the inner periphery of said packing ring adjacent said aperture, another lug situated similar to the first mentioned lug, both of said lugs being in wedging engagement with said wedge-shaped plug, and means for advancing said plug for the expansion of said packing ring.

12. In a pneumatic control valve having a diaphragm, a supply port, and exit port, an inlet port and an exhaust port, such inlet and exhaust ports being communicable, and means to regulate the compression of the diaphragm.

13. In a pneumatic control, a valve having a diaphragm, a supply port, an exit port, an inlet port connected to an exhaust port, means for converting the exit port into an inlet port in connection with the exhaust port, and for converting the inlet port into an exit port, and means to regulate the compression of the diaphragm.

14. In a pneumatic control, a valve having a diaphragm, a supply port, an exit port, an inlet port connected to an exhaust port, and means for converting the exit port into an inlet port in connection with the exhaust port and for converting the inlet port into an exit port, means for interrupting the communication between the supply port and the exit port, and means to regulate the compression of the diaphragm.

15. In a pneumatic control, a valve, a pressure regulator, a supply port, an exit port, an inlet port connected to an exhaust port, and means for converting the exit port into an inlet port in connection with the exhaust port, and for converting the inlet port into an exit port.

16. In a pneumatic control, a valve, a pressure regulator, a supply port, an exit port, an inlet port connected to an exhaust port, and means for converting the exit port into an inlet port in connection with the exhaust port, and for converting the inlet port into an exit port, and means for interrupting the connection between the inlet port and the exit port.

17. In a pneumatic control, a valve, a pressure regulator, a supply port, an exit port, an inlet port connected to an exhaust port, and means for converting the exhaust port into an inlet port in connection with the exhaust port, means for converting the inlet port into an exit port, and means for regulating the supply entering through the supply port whereby the pressure and the direction of the entrance and exit can be regulated.

18. In a pneumatic control mechanism, a cylinder, a piston in said cylinder, a carriage on a machine tool connected to said piston, a source of supply of air, a valve and pressure regulator to control said supply, a conduit to convey the air from said valve to one end of said cylinder, an air conduit from said valve to the other end of said cylinder, a tool turret, means for locking said tool turret in any desired position, an air conduit connecting said means and said valve, whereby when the carriage is advanced and retreated the tool turret may be locked and unlocked.

19. In a valve, an inlet port, an exhaust port, a piston in said valve limited in its movement in one direction by an abutment against which it is normally kept in engagement by resilient means, an unrestricted passage about said piston for the movement of the air through said valve when said piston is in normal position, a seat for said piston when in its abnormal position upon the compression of the resilient means, whereby the passage for the air between said piston and said seat is restricted when air passes in one direction.

20. In a valve casing, a supply port, an exit port, an inlet port, two exhaust ports with one of which said inlet port is in communication and the other of which is closed, means for converting said inlet port into an outlet port and closing the exhaust with which it is in connection, and means for converting the former outlet port into an inlet port in communication with said first mentioned exhaust port which is now open.

21. In a pneumatic control apparatus, a pressure chamber, an inlet port into said chamber, an outlet port from said chamber, a diaphragm, means operatively connected to said diaphragm to regulate the pressure in said chamber, resilient means for compressing said diaphragm, means of operating said diaphragm to secure any desired pressure, a valve in connection with said pressure and means for operating said valve and a single means for operating the pressure regulating means and the valve regulating means.

22. In a pneumatic control apparatus, the combination, with a single manually operable element, and a movable machine tool, of pneumatic devices for moving said machine tool in opposite directions, means for controlling the pressure of the gas supplied to said devices and connections from said manually operated element for actuating said pressure controlling means and for determining the direction of operation of said machine tool by said pneumatic devices.

23. In a pneumatic control apparatus, the combination, with a controlling handle, and a movable machine tool, of a gas operated piston having connections to move said machine tool in opposite directions, a pressure regulator for the gas including a diaphragm having a spring controlling its position, with connections from said handle for varying the tension of said diaphragm spring and for determining the direction in which said piston shall operate said machine tool.

In testimony whereof, I affix my signature.

WALTER G. HAAS.